(12) United States Patent
Ji et al.

(10) Patent No.: US 9,846,634 B2
(45) Date of Patent: Dec. 19, 2017

(54) VISUAL GRAPHICAL USER INTERFACE VERIFICATION

(71) Applicant: VMware, Inc., Palo Alto, CA (US)

(72) Inventors: Benniu Ji, Shanghai (CN); Jing Gong, Shanghai (CN); Michael Zhang, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 209 days.

(21) Appl. No.: 14/314,688

(22) Filed: Jun. 25, 2014

(65) Prior Publication Data

US 2015/0378876 A1  Dec. 31, 2015

(51) Int. Cl.
*G06F 3/14* (2006.01)
*G06F 11/36* (2006.01)

(52) U.S. Cl.
CPC ................................ *G06F 11/3688* (2013.01)

(58) Field of Classification Search
CPC ..................................... G06F 3/14; G06F 3/17
USPC ..................... 715/740, 762; 717/125; 704/9
See application file for complete search history.

(56) References Cited

U.S. PATENT DOCUMENTS

| | | | |
|---|---|---|---|
| 8,543,379 B1* | 9/2013 | Michelsen | G06F 17/2705 704/9 |
| 9,378,283 B2* | 6/2016 | Batraski | G06F 17/30864 |
| 2011/0289108 A1* | 11/2011 | Bhandari | G06F 17/30905 707/769 |
| 2013/0117731 A1* | 5/2013 | LeSuer | G06F 11/3668 717/125 |
| 2014/0013234 A1* | 1/2014 | Beveridge | G06F 3/0484 715/740 |
| 2015/0339213 A1* | 11/2015 | Lee | G06F 11/3664 717/125 |

OTHER PUBLICATIONS

Wikipedia, Selenium (Software), Jun. 25, 2014, http://en.wikipedia.org/wiki/Selenium_(software).
Wikipedia, Sikuli, Jun. 25, 2014, http://en.wikipedia.org/wiki/Sikuli.
Wikipedia, TestNG, Jun. 25, 2014, http://en.wikipedia.org/wiki/TestNG.

* cited by examiner

*Primary Examiner* — Ruay Ho (57) ABSTRACT

An automated testing system is described for efficient visual verification of graphical user interfaces of software applications. A pattern is formed for the user interface of a page of the application indicating regions of the page where user interface elements should be located and identifying which user interface element should be located in which region. During test execution, image recognition is performed using previously stored snapshots of user interface elements to determine whether the application's user interface elements appear in correct positions on the page.

20 Claims, 7 Drawing Sheets

VISUAL GRAPHICAL USER INTERFACE VERIFICATION

TECHNICAL FIELD

The present disclosure generally relates to techniques for automated testing of software and more specifically to automated testing of the graphical user interface.

BACKGROUND

Efficient testing of software presents one of the biggest challenges for software developers today. As computers and the Internet continue to form the backbone of modern business, commerce, and communication, the importance of having reliable, consistent software has become increasingly more and more critical. Particularly for businesses, errors and bugs in software can lead to losses in revenue, customer dissatisfaction, liability, and other problems. To avoid such issues, developers of software applications, whether hosted on personal computers or on websites, must put the applications through thorough testing before deploying them to users.

Automated testing software makes the process of software testing more efficient and reliable. Such software contains instructions that test software by performing various operations on the software and check for successful execution. Hence, instead of an individual testing out each function of an application manually, the automated testing software can be executed on the application to automatically test the functions, saving valuable time and cost in manual labor.

However, many issues still persist. For example, traditional graphical user interface automation test technologies may not be able to detect visual problems in the graphical user interface of an application. Such test technologies typically locate a target user interface element (UI element) at the backend and interact with it. Results are verified by checking the existence of specific UI elements or the attributes of UI elements, which may ignore a visual defect on the screen that would be apparent to a human user. Hence, a user interface (UI) automation test may be passed even though a page is visually broken as long as the UI elements exist and behave as expected. Further, various applications, such as websites, may have continuously changing content and the UI elements on the user interface of various applications may constantly undergo slight changes in position, making it more difficult for an automated test to identify when a real visual issue exists. A more efficient approach is desirable for visual user interface testing in software applications.

DETAILED DESCRIPTION

Systems and methods in accordance with various embodiments of the present disclosure overcome at least some of the above mentioned shortcomings and deficiencies by providing more efficient ways to perform automated software testing. In particular, embodiments described herein improve the efficiency of performing visual verification of a graphical user interface during automated testing.

The system comprises a computing device running an application, which can be a program, website, or any software application that can be executed on a computing device. An automated test can be executed on the application to test the application. For example, such a test can contain a test script or any computer instructions that verify that the application appears and operates correctly. In various embodiments, the test can execute various functions on the application to verify that the user interface (UI) is visually accurate. For example, to test a website, the test can open the website, navigate to a specific page, and check that correct user interface elements (UI elements) appear in correct locations on the page. The same process can be repeated on numerous pages of the website.

In various embodiments, the UI of a page of an application can be visually verified based on a user interface (UI) pattern that was previously constructed for the page. The UI pattern can use a set of various UI elements (e.g., buttons, images, etc.) identified on the page as a set of feature points that can be matched to verify that the page is intact and visually correct. Such a pattern can contain UI element location information describing where certain UI elements should be located on the page and the pattern can contain a snapshot of each UI element used in the pattern. In some embodiments, the UI pattern can use a subset of the UI elements on the page as the feature points to verify the page. In other embodiments, the UI pattern can use every UI element on the page as the set of feature points.

In order to verify that the page matches the UI pattern, the test can determine whether each UI element identified as a feature point is present in the right location on the page. For example, the system can perform image recognition based on a saved snapshot of a first or "base" UI element in the set to find the base UI element on the page. Once the base UI element is found, the system can use the pattern to check that the other UI elements in the set exist and are located in their correct respective locations. For example, the system can check where or in what region a second UI element should be located with respect to the base UI element according to the pattern. Then the system can perform image recognition in that region to confirm that the second UI element is located in the region. Similarly, the system can check that the rest of the UI elements in the set are located in their correct respective position according to the pattern. If any UI element is not found, then the page does not match the UI pattern and the system can indicate a failure in a test report.

Accordingly, the systems and methods described herein provide an efficient way for performing visual verification of a user interface during automated testing.

As used herein, the term "user interface" or "UI" refers to the graphical user interface of an application, any pages, menus, elements, and any other visual graphic representations appearing on the graphical user interface of a computing device running the application.

As used herein, the term "user interface element" or "UI element" refers to any component of an application's UI. For example, a UI element can be a button, checkbox, radio button, drop-down list, text input box, window, hyperlink, slider, menu, or file-select control.

As used herein, the term "image recognition" includes any image analysis technique for determining that two images are identical or nearly identical.

As used herein, the term "snapshot" refers to an image capture of a graphical object, such as an image of a UI element.

Figure 1:
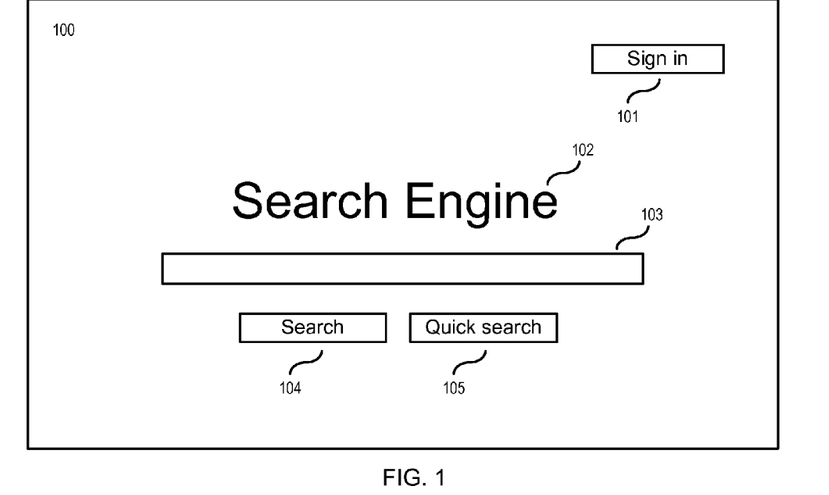
FIG. 1 illustrates an example of an application page with UI elements in correct position.

FIG. 1 illustrates an example of an application page with UI elements in correct position. As illustrated in the example of FIG. 1, a page 100 of an application, in this case an online search engine, can contain several UI elements, including a sign in button 101, a search engine logo 102, a text input box 103, a search button 104 and a quick search button 105. The figure illustrates an example of correct positioning of UI elements on a page 100.

A conventional UI automation test designed to test this page 100 might contain the steps of opening a browser; going to the search page 100; locating the search text input box 103 on the page; inputting a search key word in the search text input box 103; clicking the search button 104; and verifying that the page redirected to a correct search result page. A conventional test analyzes UI elements (e.g., text input box 103, search button 104) at the backend, and then interacts with them. For example, the test can locate a UI element by analyzing the source of the UI. The test can use a locator to identify the UI element. A locator can be an identifier that is used to locate a UI element in an application or that tells the test how to find the UI element. A locator can be any unique identifier in the code. For example, the software testing framework Selenium uses the following locators: Identifier, Id, Name, Link, DOM, XPath, CSS, or UI-element.

However, because the UI elements are accessed and interacted with at the backend, in some cases, the conventional test can be passed even if the page 100 is visually incorrect or broken.

Figure 2:
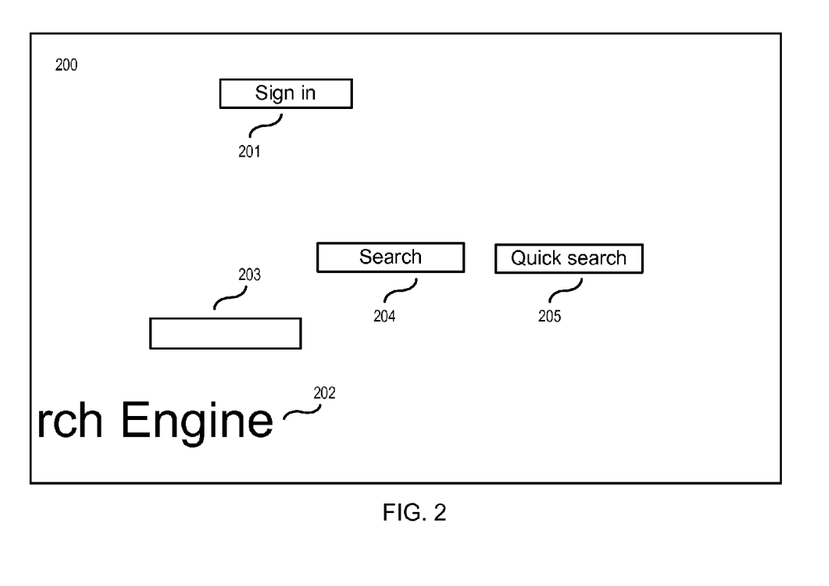
FIG. 2 illustrates an example of a visually incorrect or broken application page.

FIG. 2 illustrates an example of a visually incorrect or broken application page. As illustrated in the example of FIG. 2, an error or bug can cause various visual defects on the page 200. For example, the logo 202 appears at the bottom left of the page and runs off the page, the width of the search text input box 203 is reduced, the search button 204 and the quick search button 205 are misplaced with relation to the text input box 203, and the sign in button 201 is misaligned. While such a bug is easily caught by a human user, it may not be discovered by the conventional UI automation test described above. For example, because the UI element source or the html tree may still be correct, the automation script may still be able to locate the UI elements and perform all actions. Therefore, a conventional UI automation test may conclude that the application page is correct while the page is actually visually defective.

To deal with this issue, some tests use image recognition techniques that perform a visual comparison of the whole page with a saved image of what the whole page should look like. The testing framework Sikuli provides an example of such tester. However, this approach is insufficient because various applications, particularly web-based applications, undergo constant minor changes and content updates. For example, websites selling products, providing news-related information, and the like are constantly modified. Another approach that some tests use is to verify that particular UI elements appear somewhere on a page by performing image recognition of a snapshot of a particular UI element on the page. For example, such a test can scan a page of an application to make sure that a particular UI element, a button for example, appears somewhere on the page. However, if the button has been misplaced due to an error or a bug, the test would be passed even though visual errors are present. For example, the misplacement of the search button 204, the quick search button 205, and the sign in button 201 would not result in a test failure with this approach.

The approaches described herein resolve at least some of the above problems by creating a pattern for a page of an application and verifying that the UI elements on the page fit the pattern during the test.

Figure 3:
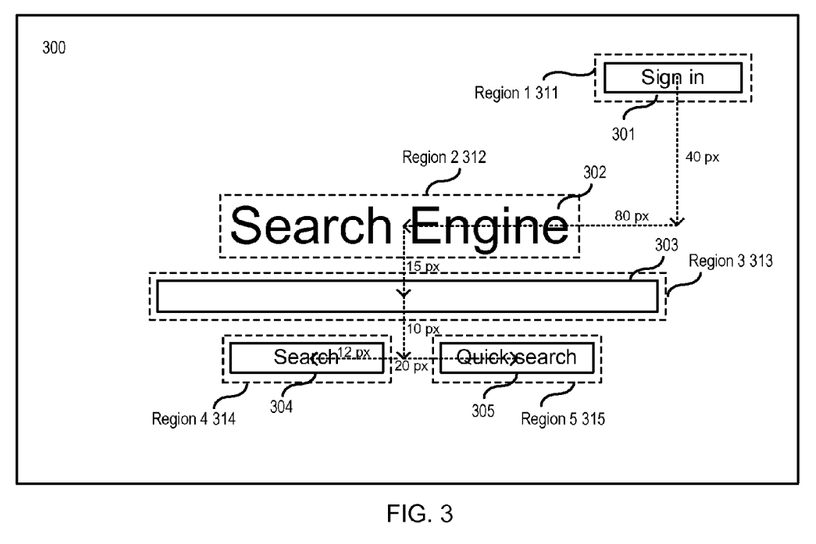
FIG. 3 illustrates an example of a UI pattern being constructed for an application page.

FIG. 3 illustrates an example of a UI pattern being constructed for an application page. As illustrated in the example of FIG. 3, a page 300 of an application, in this case an online search engine, contains several UI elements, including a sign in button 301, a search engine logo 302, a text input box 303, a search button 304, and a quick search button 305. In various embodiments, these UI elements can be used as feature points to create a UI pattern of the page, which can later be used to verify that the page did not change visually in any significant way. To create the UI pattern, a region can be selected around each UI element. For example, region 1 311 can be selected around the sign in button 301, region 2 312 can be selected around the search engine logo 302, region 3 313 can be selected around the text input box 303, region 4 314 can be selected around the search button 304, and region 5 315 can be selected around the quick search button 305. A region can determine an area within which the corresponding UI element's image should be located in order for the test to pass visual verification. For example, if any part of the search button's 304 image is located outside of the region 4 314, then the system can call for a test failure. In various embodiments, a region can be slightly larger than the UI element to permit the UI element to move some distance without triggering a failure report. Similarly, in various embodiments, the test can be configured in other ways, for example, so that the entire UI element has to be located outside of the region to constitute a failure, or so that when a certain percentage of the UI element is located outside the region, the test results in a failure. In various embodiments, a region corresponding to a UI element can be selected automatically by the system according to an algorithm. In other embodiments, a region corresponding to a UI element can be selected manually by a user of the system.

In various embodiments, the relative position of the regions with respect to each other can be calculated and stored as part of the UI pattern. In an embodiment, the relative positions of the regions can be determined based on the relative locations of the centers of the regions. For example, the pattern can record that region 2 312 is located 40 pixels below and 80 pixels to the left of region 1 311; region 3 313 is located 15 pixels below region 2 312; region 4 314 is located 10 pixels below and 12 pixels to the left of region 3 313; and region 5 315 is located 20 pixels to the right of region 4 314. In various embodiments, other methods can be used to store the relative position of the regions, for example, the relative position of each region with respect to a certain location, such as the center of the page, a particular UI element on the page, or with respect to any other attribute of the page can be used. In other embodiments, the coordinates of each region with respect to the page 300 itself can be used, such as the horizontal and vertical distances from the top, left corner of the page 300.

In various embodiments, a snapshot of each UI element used in the pattern can be stored as part of the UI pattern. During a test of the page 300, the system can retrieve a previously saved snapshot of a first or "base" UI element, e.g., the sign in button 301, and perform image recognition of the snapshot on the page 300. If a matching image is found, then the system can assume that the place of region 1 311 is around the matching image. Once region 1 311 is located, the locations of other regions (e.g., region 2 312, region 3 313, region 4 314, region 5 315) can be determined based on the pattern. The test can then proceed to checking region 2 312. A snapshot of the UI element corresponding to region 2 312 can be retrieved, in this case a snapshot of the search engine logo 302. The test can locate region 2 312 based on the relative position of region 2 312 to region 1 311, and the test can perform image recognition based on the retrieved snapshot of the logo 302 to determine whether the image of the search engine logo 302 is located within region 2 312. If the logo 302 is outside of the region 2 312, or if the logo 302 is not found at all, the test can indicate a failure to locate the logo 302. If the logo 302 is not outside of the region 2 312, the test can proceed to performing the same verification process in region 3 313 by performing image recognition of a snapshot of the search text input box 303. The region 3 313 can be located based on the relative position of region 3 313 with respect to region 2 312. The test can proceed to performing the same verification process in region 4 314, and region 5 315 until all UI elements in the pattern are verified.

A UI pattern can be created for each page of the numerous pages of an application and each page can be visually verified based on its corresponding UI pattern during an automated test. In various embodiments, an engineer can select which UI elements on a page should be used as the feature points of the pattern. An engineer can also determine the order in which the UI elements on the page are verified. In various embodiments, an engineer can decide on the size of the region corresponding to a particular element. In some cases, a region may be large to permit a UI element to move around without causing a test failure. In other cases, the region may be the exact size of the UI element, not permitting the UI element to move around the page at all.

Figure 4:
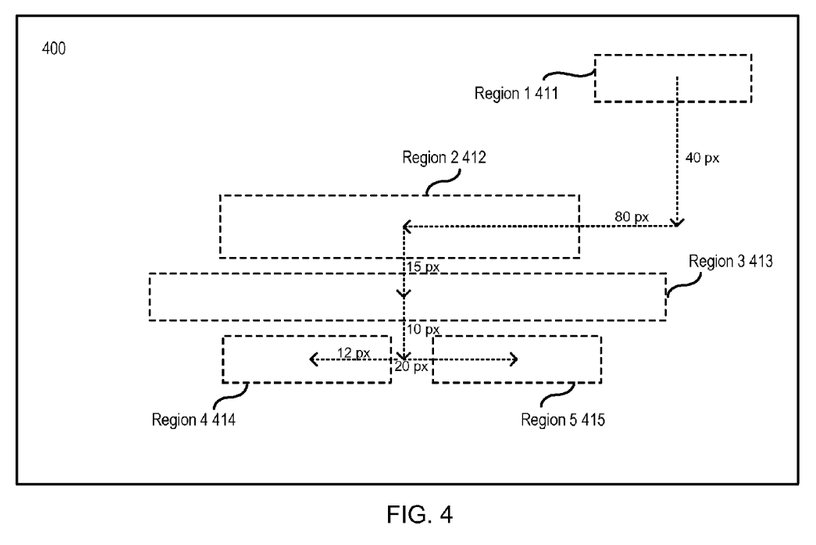
FIG. 4 illustrates an example of an application page pattern.

FIG. 4 illustrates an example of an application page UI pattern. As illustrated in the example of FIG. 4, the UI pattern corresponding to a page 400 of the application can contain a region corresponding to various UI elements, for example, region 1 411, region 2 412, region 3 413, region 4 414, and region 5 415. The pattern can further contain information with regard to the relative positioning of the regions with respect to each other. Snapshots of UI elements that are located in each of the regions can be stored with the pattern. During a test, the location of a UI element on the page can be checked by performing image recognition on the page based on the UI element's snapshot. If the location of a UI element is not in the UI element's respective region, then the test can indicate the failure in a test report.

Figure 5:
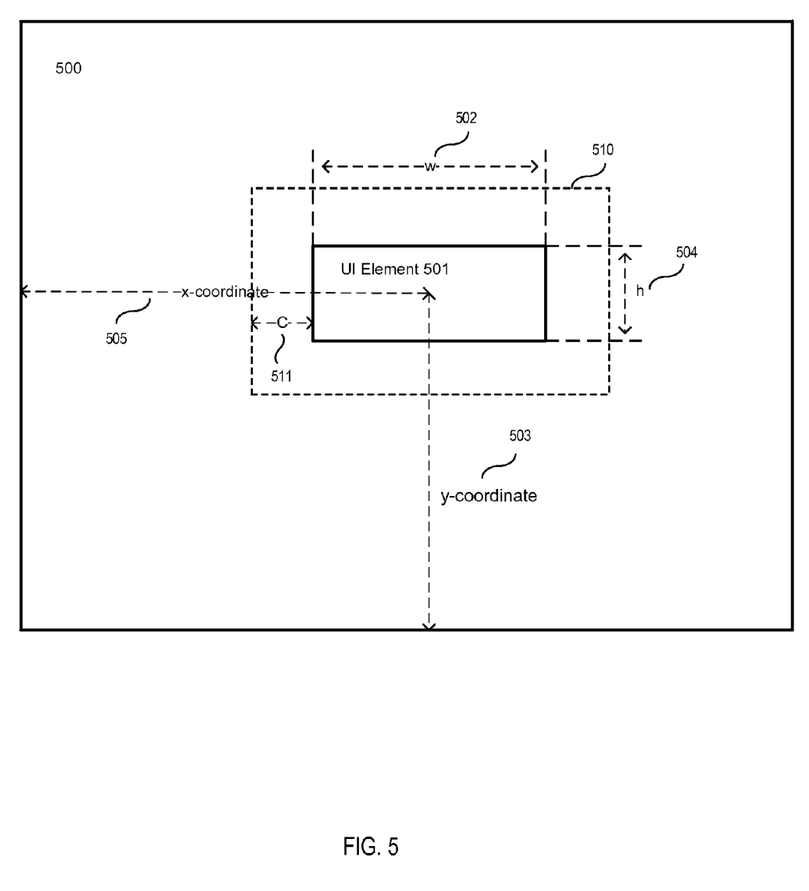
FIG. 5 illustrates an example of how a region is calculated.

FIG. 5 illustrates an example of how a region is calculated. As illustrated in the example of FIG. 5, a UI element 501 can be located on a page of an application 500. The x-coordinate 505 and y-coordinate 503 of the UI element 501 can be calculated as the distance to the center of the UI element 501 from the left side of the page and the bottom of the page, respectively. The width (w) 502 of the UI element 501 can be calculated as the distance from its right edge to its left edge. The height (h) 504 of the UI element can be calculated as the distance from its bottom edge to its top edge. A region 510 can be a rectangular area defined by parameters (X, Y, W, H), where (X,Y) is the upper left corner of the region and (W, H) are its width and height. A certain margin (C) 511 can create space between the UI element 501 and the boundary of the region 510. In this case, the parameters of the region 510 would be calculated as follows:

$$X = x - w/2 - C$$

$$Y = y + h/2 + C$$

$$W = w + 2C$$

$$H = h + 2C$$

Figure 6A:
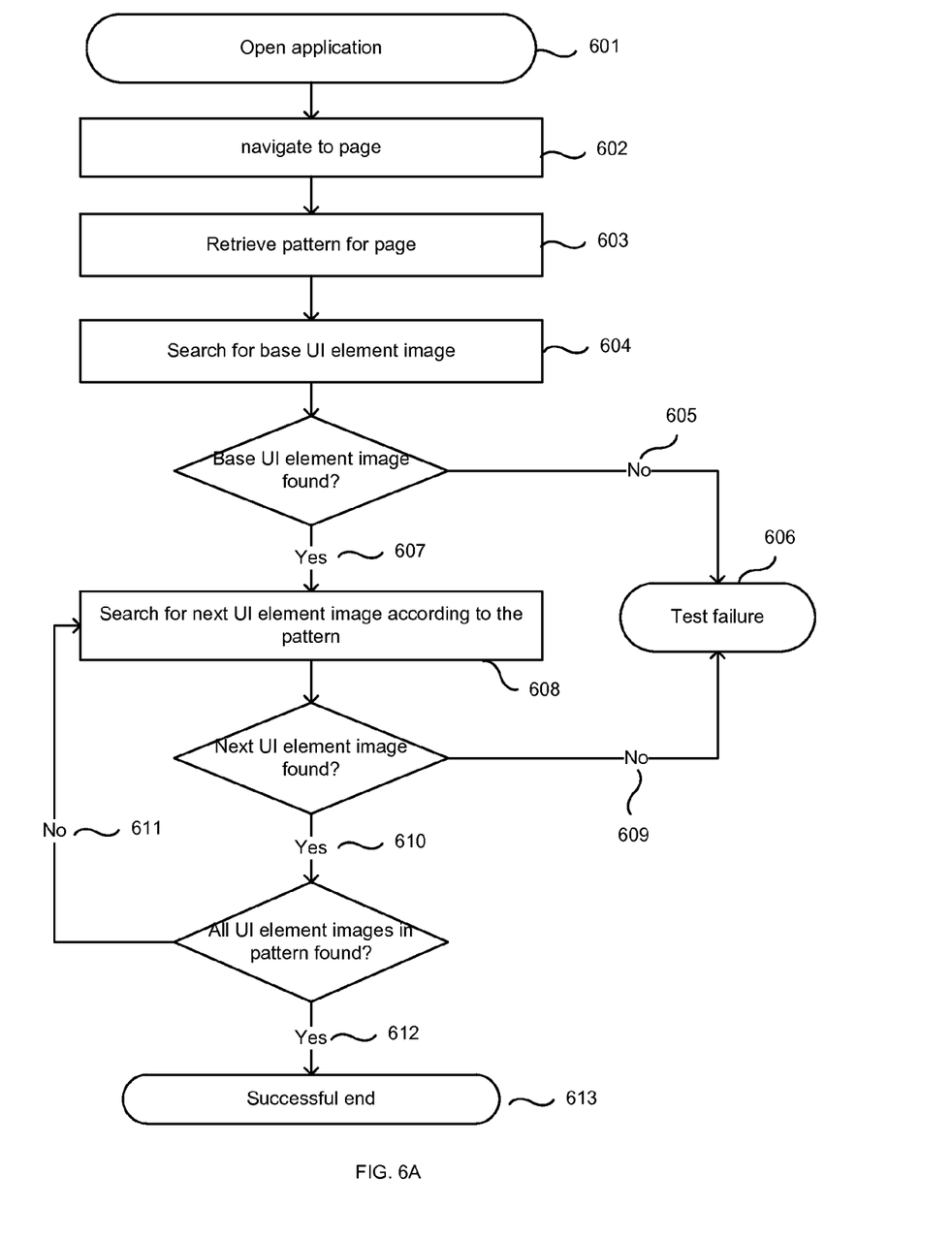
FIG. 6A illustrates a sample process flow for visual user interface verification of a page of an application.

FIG. 6A illustrates a sample process flow for visual user interface verification of a page of an application. The process can start by the test opening the application 601. The test can navigate through the application to a page for testing 602. A pattern can be retrieved for the page 603 containing snapshots of UI elements and regions for their locations on the page. The test can retrieve a snapshot of a base UI element and search for the base UI element image 604 on the page by performing image recognition. If the base UI element image is not found 605, the test can report a test failure 606. If the base UI element image is found 607, then the test can search for the next UI element image according to the pattern 608. For example, the test can determine the location of the region for the next UI element based on the relative position of the region with respect to the base UI element, as indicated by the pattern. The test can retrieve a snapshot for the next UI element and perform image recognition to determine if a matching image exists in the region. If the next UI element is not found 609, then the test can report a failure 606. If the next UI element is found 610, and not all UI elements in the pattern have been found 611, then the process can be repeated to search for the next UI element image according to the pattern 608. For example, the test can determine the location of the region for each subsequent UI element in the pattern based on the relative position of the region with respect to a previously found UI element, as indicated by the pattern. Once all UI elements in the pattern are found 612, the test can reach a successful end 613.

In various embodiments, the test can be configured such that as long as a certain predetermined portion or percentage of UI elements on a page are found, then the test is passed. The portion or percentage can be determined by users of the system. For example, if the percentage is set to 100%, then the test would only be passed if all UI elements on the page are found; if the percentage is set to 50%, then the test would only be passed if at least half of the UI elements on the page are found.

Figure 6B:
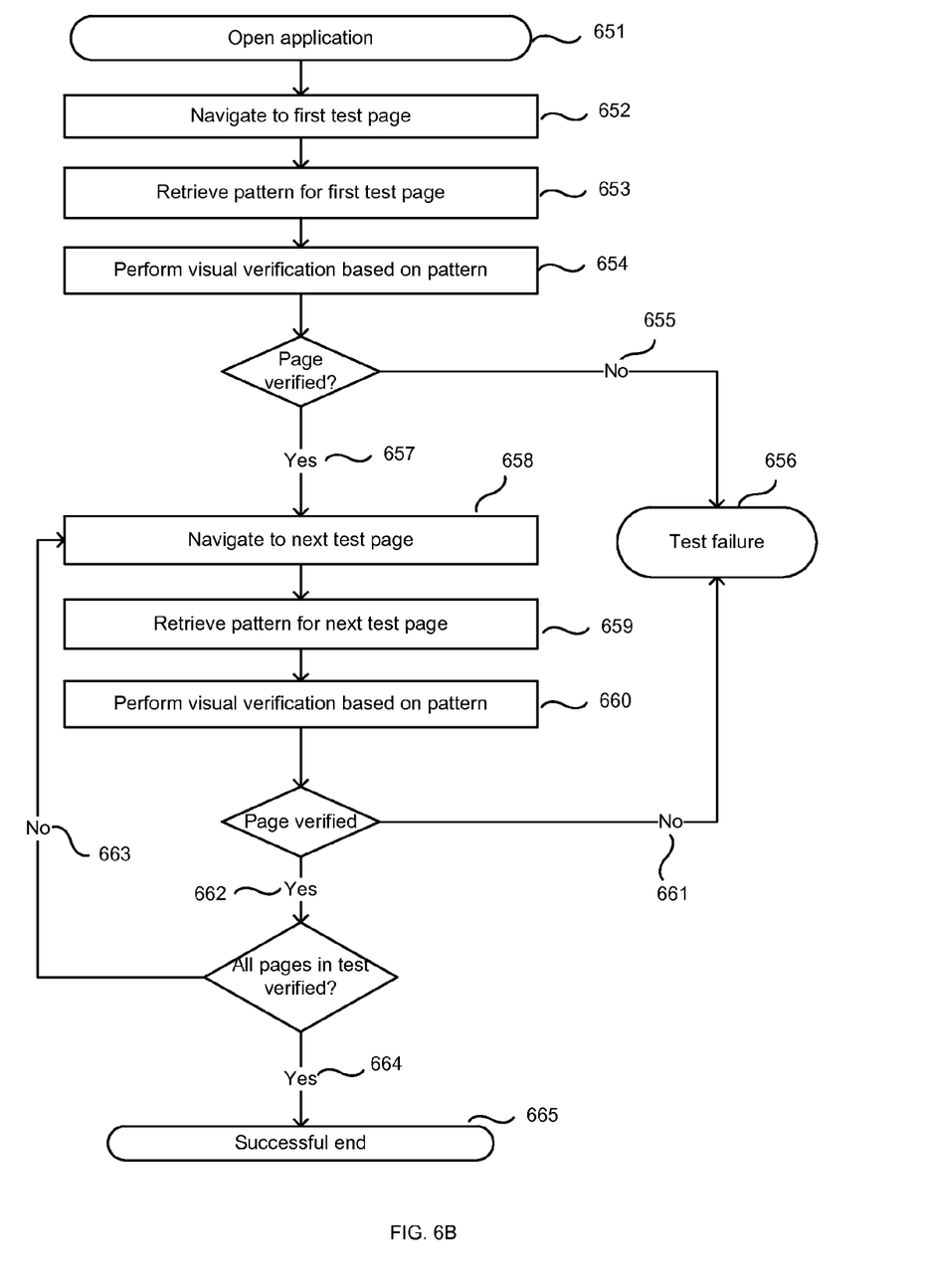
FIG. 6B illustrates a sample process flow for a test of an application.

FIG. 6B illustrates a sample process flow for a test of an application. The process can start by opening the application 651. The test can navigate through the application to a first test page 652. A pattern can be retrieved for the first test page 653 for visually verifying the UI of the first test page. The test can perform visual verification of the first test page based on the pattern 654 by verifying that UI elements are located in correct locations on the page according to the pattern. If the page is not verified 655, then the test can report a failure 656. If the page is verified 657, then the test can navigate to the next test page 658. A pattern can be retrieved for the next test page 659. Visual verification can be performed on the next test page based on the pattern 660 by verifying that UI elements are located in correct locations on the page according to the pattern. If the page is not verified 661, then the test can report a failure 656. If the page is verified 662, then the test can check if all pages in the test have been verified. If all pages have been verified 664, then the test can reach a successful end 665. If all pages have not been verified 663, then the test can navigate to the next test page 658 and the process can repeat on the next test page.

Figure 7:
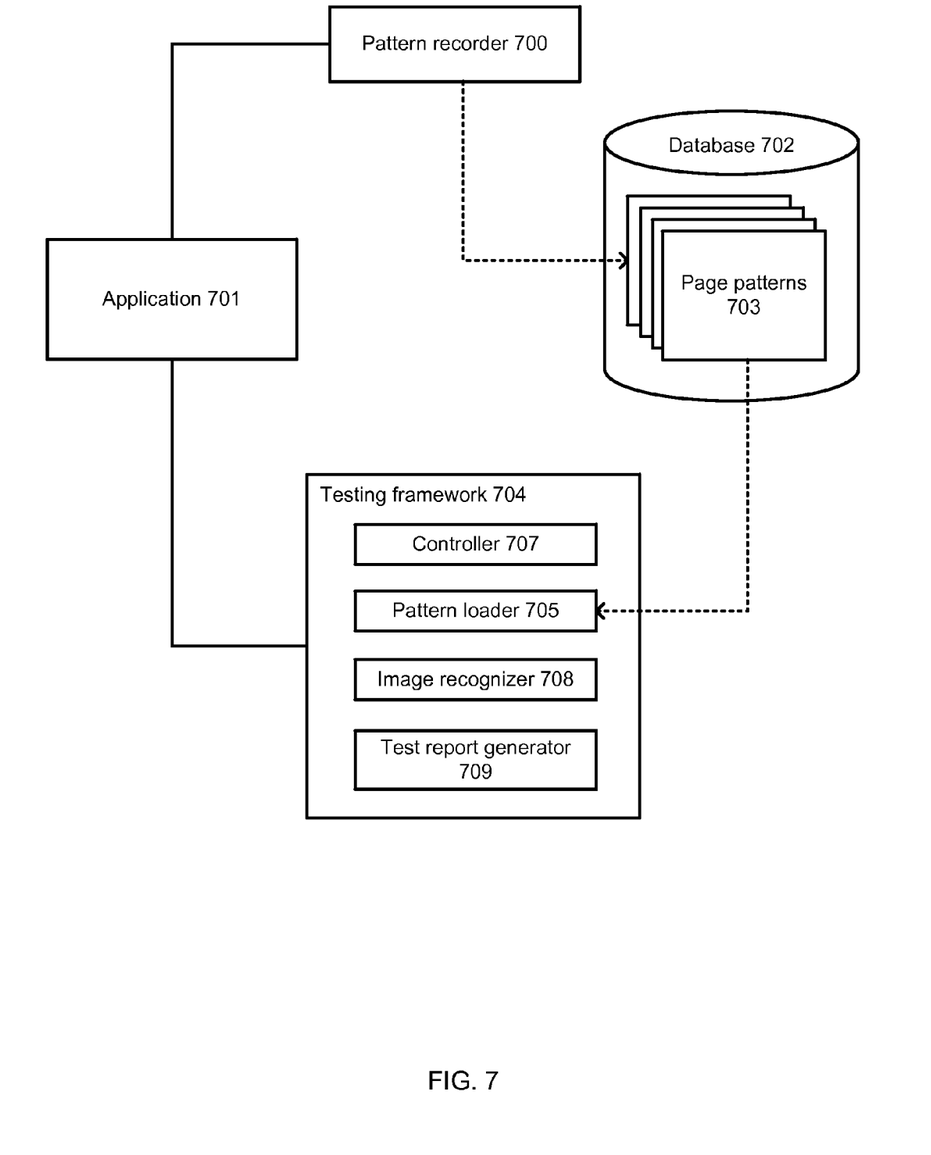
FIG. 7. Illustrates an example system for visual user interface verification.

FIG. 7. Illustrates an example system for visual user interface verification. A pattern recorder 700 can create page patterns based on pages of an application 701 and the page patterns 703 can be stored in a database 702. The patterns 703 can contain snapshots of UI elements on the page and relative positions of UI elements with respect to each other. For example, the recorder can enable users to create patterns, such as by providing the capability to capture snapshots of UI elements and save the snapshots and relative coordinates between the UI elements into files that are then stored in the database 702 as page patterns 703. A testing framework 704 can use the page patterns 703 to perform visual user interface verification on the application 701. A controller 707 can be the execution engine for performing test instructions such as opening the application, navigating through the application and its pages, and performing other functions. A pattern loader 705 can retrieve a page pattern from the page patterns 703 in the database 702, load the pattern, and convert the pattern into data structures. An image recognizer 708 can perform image recognition functions, such as comparing snapshots of UI elements to check that the UI element images are present on the page and to determine the locations of the images. The controller 707 can calculate each region based on the pattern and the location of each region, and verify that each UI element's image is within the region indicated by the pattern. A test report generator 709 can produce test reports describing the results of the test for users of the system.

In various embodiments, existing technologies can be used to perform some of the system's functions. For example, the software testing framework Selenium can be used by the controller to perform operations on a web browser. For example, the controller 707 can use Selenium functions to open a browser and navigate to a webpage to be verified.

The user interface automation framework and image recognition techniques can be based on various commercially available tools, such as the Sikuli automation tools. For example, Sikuli can be used to create patterns, such as for capturing snapshots of UI elements from the page during pattern creation. Sikuli's image recognition techniques can also be used, such as for performing image recognition during pattern verification. For example, Sikuli provides tools to search an image on the screen or in a specified region on the screen. Hence, the controller 707 can determine the region where an image should be located according to a pattern and use Sikuli to search for the image in this region.

The testing framework can be based on various commercially available platforms, such as TestNG, JUnit, or Ruby Unit. For example, the testing framework TestNG can be used to execute automation tests and produce result reports. For example, automation tests can be TestNG cases written in java and organized in TestNG suites. Each test can also be associated with a resource folder that contains the patterns. The execution result can be presented as XML files or HTML files.

Figure 8:
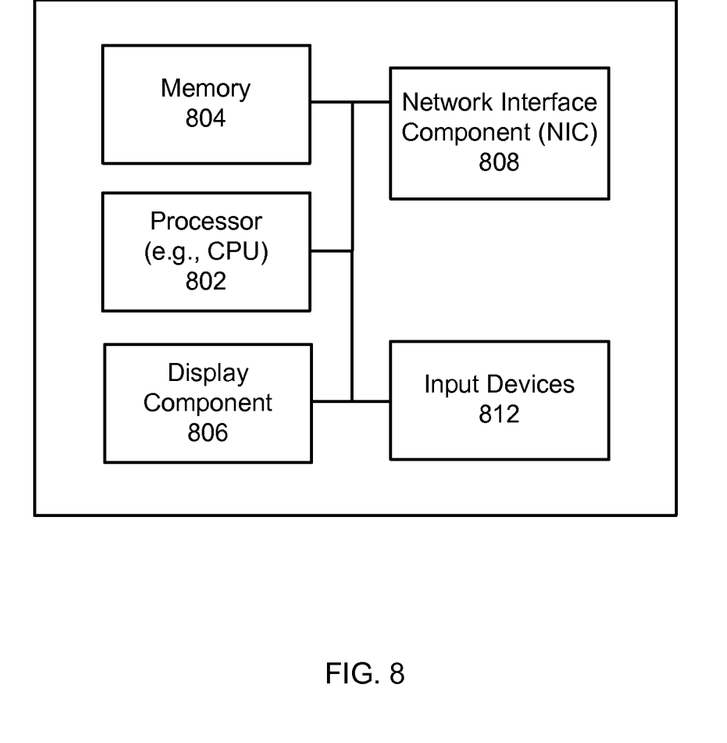
FIG. 8 illustrates an example of some general components of a computing device, in accordance with various embodiments.

FIG. 8 illustrates an example of some general components of a computing device, in accordance with various embodiments. In this particular example, the device includes one or more processors (e.g., central processing units (CPUs) 802 for executing instructions that can be stored in physical memory component 804. The memory component 804 can include many types of memory, data storage, or non-transitory computer-readable storage media, such as random access memory (RAM) storing program instructions for execution by the processor 802, a separate form of storage for images or data, a removable memory for sharing information with other devices and the like. The computing device typically can further comprise a display component 806, such as a monitor, a touch screen, liquid crystal display (LCD), or the like. In various embodiments, the computing device will include at least one input device 812 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 808 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for automated testing of a user interface (UI) of a software application, the method comprising stages executed on a processor of a computing device, the stages comprising:

executing a test on a page of the UI of the application, the test configured to determine whether a plurality of UI elements appear in correct respective visual locations, relative to one another, according to a stored, previously constructed pattern corresponding to the page;

retrieving the stored, previously constructed pattern from a database, wherein the pattern comprises a plurality of snapshots, each snapshot including at least one of the plurality of UI elements, and wherein the pattern also comprises location information corresponding to a respective visual location of each of the plurality of UI elements on the page relative to one another; and verifying that the page of the UI of the application matches the stored, previously constructed pattern by identifying at least two of the plurality of UI elements based on the respective snapshots of the at least two UI elements and determining whether the at least two UI elements are in the same respective visual locations on the page, relative to one another, as in the pattern, based on the location information corresponding to the at least two UI elements.

2. The method of claim 1, wherein the location information further comprises information defining, for each of the plurality of UI elements, a region corresponding to the UI element; and wherein verifying that the page of the UI of the application matches the pattern further comprises performing image recognition of a snapshot of each of the plurality of UI elements to determine if the UI element is located within the region of the UI corresponding to the UI element.

3. The method of claim 2, wherein performing image recognition of the snapshot of each of the plurality of UI elements further comprises checking whether a matching image to the snapshot is located within the region of the UI corresponding to the UI element.

4. The method of claim 2, wherein the information defining, for each of the plurality of UI elements, a region corresponding to the UI element further comprises:

information defining a size and shape of the region; and information defining the location of the region on the page.

5. The method of claim 2, further comprising:

identifying the location of a base UI element on the page, wherein the base UI element is one of the plurality of UI elements, by performing image recognition of a snapshot of the base UI element on the page, wherein the location information defining the region corresponding to at least one other UI element in the plurality of UI elements comprises information defining the location of the at least one other UI element with respect to the location of the base UI element.

6. The method of claim 2, wherein the location information comprises the relative position of at least two regions with respect to each other.

7. The method of claim 1, wherein each of the plurality of UI elements is a non-text UI element.

8. A computing device, comprising:

at least one processor; and memory including instructions that, when executed by the at least one processor, cause the computing device to:

execute a test on a page of a user interface (UI) of an application, the test configured to determine whether a plurality of UI elements appear in correct respective visual locations, relative to one another, according to a stored, previously constructed pattern corresponding to the page;

retrieve the stored, previously constructed pattern from a database, wherein the pattern comprises a plurality of snapshots, each snapshot including at least one of the plurality of UI elements, and wherein the pattern also comprises location information corresponding to a respective visual location of each of the plurality of UI elements on the page relative to one another; and verify that the page of the UI of the application matches the stored, previously constructed pattern by identifying at least two of the plurality of UI elements based on the respective snapshots of the at least two UI elements and determining whether the at least two UI elements are in the same respective visual locations on the page, relative to one another, as in the pattern, based on the location information corresponding to the at least two UI elements.

9. The computing device of claim 8, wherein the location information further comprises information defining, for each of the plurality of UI elements, a region corresponding to the UI element; and verifying that the page of the UI of the application matches the pattern further comprises performing image recognition of a snapshot of each of the plurality of UI elements to determine if the UI element is located within the region of the UI corresponding to the UI element.

10. The computing device of claim 9, wherein performing image recognition of the snapshot of each of the plurality of UI elements further comprises checking whether a matching image to the snapshot is located within the region of the UI corresponding to the UI element.

11. The computing device of claim 9, wherein the information defining, for each of the plurality of UI elements, a region corresponding to the UI element further comprises:

information defining a size and shape of the region; and
information defining the location of the region on the page.

12. The computing device of claim 9, wherein the memory further includes instructions that when executed by the at least one processor, cause the computing device to:

identify the location of a base UI element on the page, wherein the base UI element is one of the plurality of UI elements, by performing image recognition of a snapshot of the base UI element on the page, wherein the location information defining the region corresponding to at least one other UI element in the plurality of UI elements comprises information defining the location of the at least one other UI element with respect to the location of the base UI element.

13. The computing device of claim 9, wherein the location information comprises the relative position of at least two regions with respect to each other.

14. The computing device of claim 8, wherein each of the plurality of UI elements is a non-text UI element.

15. A non-transitory computer readable storage medium comprising one or more sequences of instructions, the instructions when executed by one or more processors causing the one or more processors to execute the operations of:

executing a test on a page of a user interface (UI) of an application, the test configured to determine whether a plurality of UI elements appear in correct respective visual locations, relative to one another, according to a stored, previously constructed pattern corresponding to the page;

retrieving the stored, previously constructed pattern from a database, wherein the pattern comprises a plurality of snapshots, each snapshot including at least one of the plurality of UI elements, and wherein the pattern also comprises location information corresponding to a respective visual location of each of the plurality of UI elements on the page relative to one another; and verifying that the page of the UI of the application matches the stored, previously constructed pattern by identifying at least two of the plurality of UI elements based on the respective snapshots of the at least two UI elements and determining whether the at least two UI elements are in the same respective visual locations on the page, relative to one another, as in the pattern, based on the location information corresponding to the at least two UI elements.

16. The non-transitory computer readable storage medium of claim 15, wherein the location information further comprises information defining for each of the plurality of UI elements a region corresponding to the UI element; and verifying that the page of the UI of the application matches the pattern further comprises performing image recognition of a snapshot of each of the plurality of UI elements to determine if the UI element is located within the region of the UI corresponding to the UI element.

17. The non-transitory computer readable storage medium of claim 16, wherein performing image recognition of the snapshot of each of the plurality of UI elements further comprises checking whether a matching image to the snapshot is located within the region of the UI corresponding to the UI element.

18. The non-transitory computer readable storage medium of claim 16, wherein the information defining, for each of the plurality of UI elements, a region corresponding to the UI element further comprises:

information defining a size and shape of the region; and
information defining the location of the region on the page.

19. The non-transitory computer readable storage medium of claim 16, further comprising instructions that when executed by the one or more processors cause the one or more processors to execute the operations of:

identifying the location of a base UI element on the page, wherein the base UI element is one of the plurality of UI elements, by performing image recognition of a snapshot of the base UI element on the page, wherein the location information defining the region corresponding to at least one other UI element in the plurality of UI elements further comprises information defining the location of the at least one other UI element with respect to the location of the base UI element.

20. The non-transitory computer readable storage medium of claim 16, wherein the location information comprises the relative position of at least two regions with respect to each other.

* * * * *